United States Patent
Zhao et al.

(10) Patent No.: US 11,911,786 B2
(45) Date of Patent: Feb. 27, 2024

(54) HYDRATE ENERGY-STORAGE TEMPERATURE-CONTROL MATERIAL AND PREPARATION METHOD THEREFOR

(71) Applicant: DALIAN UNIVERSITY OF TECHNOLOGY, Liaoning (CN)

(72) Inventors: Jiafei Zhao, Liaoning (CN); Yongchen Song, Liaoning (CN); Mingzhao Yang, Liaoning (CN); Hongsheng Dong, Liaoning (CN); Lunxiang Zhang, Liaoning (CN); Quan Shi, Liaoning (CN); Lei Yang, Liaoning (CN); Zheng Ling, Liaoning (CN); Xiang Sun, Liaoning (CN); Yanghui Li, Liaoning (CN); Weiguo Liu, Liaoning (CN)

(73) Assignee: DALIAN UNIVERSITY OF TECHNOLOGY, Liaoning (CN)

(*) Notice: Subject to any disclaimer, the term of this patent is extended or adjusted under 35 U.S.C. 154(b) by 195 days.

(21) Appl. No.: 17/628,104

(22) PCT Filed: Jun. 30, 2021

(86) PCT No.: PCT/CN2021/103346
§ 371 (c)(1),
(2) Date: Jan. 18, 2022

(87) PCT Pub. No.: WO2022/127074
PCT Pub. Date: Jun. 23, 2022

(65) Prior Publication Data
US 2022/0395848 A1 Dec. 15, 2022

(30) Foreign Application Priority Data

Dec. 18, 2020 (CN) .......................... 202011502728.6

(51) Int. Cl.
*B05B 5/08* (2006.01)
*B05D 1/06* (2006.01)
(Continued)

(52) U.S. Cl.
CPC .............. *B05B 5/081* (2013.01); *B05B 5/084* (2013.01); *B05D 1/06* (2013.01); *C09K 5/063* (2013.01); *C09K 5/066* (2013.01); *B05D 1/04* (2013.01)

(58) Field of Classification Search
CPC ........... B05B 5/081; B05B 5/084; B05D 1/04; B05D 1/06; C09K 5/063; C09K 5/066
(Continued)

(56) References Cited

U.S. PATENT DOCUMENTS 3,482,412 A * 12/1969 Waldin .................... F28C 3/005
62/266
4,708,812 A * 11/1987 Hatfield ................... B01J 13/16
118/62
(Continued)

FOREIGN PATENT DOCUMENTS

CN 101254447 A 9/2008
CN 102295917 A 12/2011
(Continued)

*Primary Examiner* — Brian K Talbot
(74) *Attorney, Agent, or Firm* — Muncy, Geissler, Olds & Lowe, P.C.

(57) ABSTRACT

The present invention discloses a hydrate energy-storage temperature-control material and a preparation method therefor. The material includes a refrigerant hydrate and a cross-linked polymer. The preparation method comprises the following steps: first, preparing a refrigerant hydrate by using a high-pressure reactor, and conducting grinding, crushing and sieving to obtain hydrate particles; then, uniformly spraying polytetrafluoroethylene suspended ultrafine powder onto the surface of the hydrate particles by using an electrostatic spraying device, and putting the hydrate par-
(Continued)

ticles into a plasma instrument to modify polytetrafluoroethylene so as to allow free radicals to be formed on the polytetrafluoroethylene powder surface; finally, subjecting monomers to graft polymerization with the free radicals on the polytetrafluoroethylene surface under the irradiation of a high-pressure mercury lamp of UV lighting system to stabilize the structure of the material, preparing a final product. According to the present invention, a hydrate energy-storage temperature-control material with good stability is prepared. A method capable of preparing various types of refrigerant hydrate materials is provided. The product can give full play to the advantages of hydrate energy storage and temperature control, can be periodically used, and can be used in various fields such as building, refrigeration, etc.

9 Claims, 1 Drawing Sheet

(51) Int. Cl.
    *C09K 5/06*     (2006.01)
    *B05D 1/04*     (2006.01)

(58) Field of Classification Search
    USPC .......................................................... 427/475
    See application file for complete search history.

(56) References Cited

U.S. PATENT DOCUMENTS

| | | | |
|---|---|---|---|
| 2006/0147710 A1* | 7/2006 | Rockenfeller | D06M 11/00 |
| | | | 428/375 |
| 2007/0100178 A1* | 5/2007 | Carstens | B01J 7/02 |
| | | | 422/198 |
| 2010/0240827 A1* | 9/2010 | Barwick | B05D 1/62 |
| | | | 524/577 |
| 2013/0244100 A1* | 9/2013 | Tan | H01M 4/5825 |
| | | | 429/188 |
| 2018/0123164 A1* | 5/2018 | Han | C01G 49/0072 |
| 2020/0290882 A1* | 9/2020 | Fredrick | H01M 4/04 |
| 2021/0041183 A1* | 2/2021 | Ishmael | C09K 5/063 |

FOREIGN PATENT DOCUMENTS

| | | |
|---|---|---|
| CN | 102676124 A | 9/2012 |
| CN | 112625655 A | 4/2021 |
| JP | 2006232940 A | 9/2006 |

* cited by examiner

Monomer Steam →

HYDRATE ENERGY-STORAGE TEMPERATURE-CONTROL MATERIAL AND PREPARATION METHOD THEREFOR

TECHNICAL FIELD

The present invention belongs to the field of energy utilization, and particularly relates to a hydrate energy-storage temperature-control material and a preparation method therefor.

BACKGROUND

As an important energy, heat energy plays an irreplaceable role in human production and life. Heat energy storage generally includes three methods: sensible heat storage, latent heat storage and thermochemical storage. Latent heat storage is a low-cost heat storage method, which uses the transformation of solid and liquid phases of a phase change material to absorb or release heat to achieve the purpose of heat storage and energy storage; and is the most effective method of heat energy storage, which can provide high heat storage density at a low temperature of interval between heat storage and heat release. The material used for heat energy storage is called phase change material, which is now widely used in buildings, refrigeration, air conditioning, textile and other fields. In order to avoid the safety problems caused by pollution of environment, inflammability and other characteristics of the phase change material, the phase change material may be encapsulated generally. The microcapsule encapsulated phase change material can increase the heat transfer area of phase change material and improve the heat conductivity coefficient, and can be applied to energy-saving building materials and heat regulating fibers due to the small encapsulation diameter.

The phase change material can be divided into organic, inorganic and eutectic materials. The organic material is widely used for latent heat storage, has no corrosivity, and has congruent melting characteristic and self-nucleation ability. The inorganic material has high latent heat and high thermal conductivity, and has nontoxicity and other characteristics. However, the traditional microcapsule phase change material may have some inherent defects such as low thermal conductivity, easy phase separation, etc. In recent years, hydrate is widely used in the energy storage technology, and has three structures as an ice-like substance. Compared with the traditional phase change materials, hydrate is higher than other traditional phase change materials in latent heat at a phase change temperature of 4-15° C. Hydrate can be generated by means of two driving forces and can release a lot of heat by increasing the temperature or reducing the pressure, has been widely studied and used in air conditioning, refrigeration, food preservation and other aspects, and is a unique phase change material.

In order to give full play to the advantages of hydrate energy storage and temperature control, the present invention provides a preparation method for preparing a hydrate energy-storage temperature-control material. By means of the method, various types of refrigerant hydrate materials can be prepared and can be produced in a process-oriented mode, and the products prepared can be reused.

SUMMARY

In view of the defects of the prior art, the present invention provides a preparation method for a hydrate energy-storage temperature-control material, to prepare refrigerant hydrate energy-storage temperature-control materials and to further provide a method for preparing various types of hydrate energy-storage temperature-control materials.

A hydrate energy-storage temperature-control material, comprising a core and a shell, wherein the core is made of a hydrate of refrigerant and water, and the shell is made of across-linked polymer.

A preparation method for the hydrate energy-storage temperature-control material, comprising the following steps:

step 1. generating a refrigerant hydrate;

step 2. crushing the hydrate: taking out the formed hydrate from a reactor, crushing, grinding and sieving by using a screen to obtain hydrate particles with a particle size of 180-250 μm and weighting same, and centrifuging by using a centrifugal machine at a revolving speed of not less than 2000 r/min for solid-liquid separation for 10-20 min;

step 3. spraying polytetrafluoroethylene suspended ultrafine powder onto the hydrate particles by using an electrostatic spraying device: placing the hydrate particles crushed in step 2 on a conveyor belt, and adding a high-voltage electrostatic field between a nozzle and the hydrate particles, so the polytetrafluoroethylene suspended powder is adsorbed and coated onto the hydrate particles under the action of electrostatic force and gravity;

step 4. placing the hydrate particles onto which the polytetrafluoroethylene powder is sprayed into a plasma instrument, and processing by using argon plasma so as to allow free radicals to be formed on the polytetrafluoroethylene surface.

step 5. placing the hydrate particles wrapped by modified PTFE powder into a vacuum closed container, heating a monomer solution until steam evaporates, keeping an airflow pressure at 40-50 Pa by using a throttle valve, introducing into the closed container, cooling the closed container by using a water bath of 25-30° C. and irradiating by using a high-pressure mercury lamp of ultraviolet lighting system for 80-90 min, to promote graft polymerization of a monomer and free radicals; obtaining the hydrate energy-storage temperature-control material.

Further, generating a hydrate in step 1 includes: ① cleaning and flushing the reactor by using deionized water, pouring the water into the reactor, and exhausting air from the reactor by using a vacuum pump; ② introducing refrigerant into the reactor, cooling the reactor to a temperature below the hydrate phase equilibrium temperature and above the freezing temperature by using a refrigeration cycle cooling system in which the reactor is placed according to the type of the refrigerant and the refrigerant hydrate phase diagram, pressurizing the reactor to the pressure point in a hydrate stabilization region corresponding to the temperature in a phase diagram after the temperature in the reactor is stabilized, and turning on a magnetic stirrer to initiate generation of the hydrate; ③ judging whether the hydrate is initially formed through the increase of the temperature in the reactor, wherein the sudden increase of the temperature in the reactor indicates that the hydrate formation reaction begins to release heat; the gradual decrease of the temperature in the reactor until the temperature is stabilized at the original temperature within 1 h indicates that a stable state is reached, and the hydrate is generated completely; measuring the temperature in the reactor by using a temperature sensor in the reactor, measuring the pressure in the reactor by using a pressure sensor, and gathering pressure and temperature signals by a data recording system and collecting same by a personal computer.

Further, the hydrate refrigerant is a mixed liquid of one or more of tetrahydrofuran, cyclopentane and methylcyclohexane.

Further, a magnetic stirrer is present in the reactor, and the magnetic stirrer has a revolving speed of 500-600 rpm, to initiate generation of the hydrate.

Further, the electrostatic spraying device in step 3 comprises: a storage bin, a coating propulsion device, a DC power supply, a nozzle, a conveyor belt and a collection device, wherein the storage bin is configured to internally store spraying material-polytetrafluoroethylene suspended ultrafine powder; the coating propulsion device is connected with a spraying device of the storage bin and the nozzle respectively; the nozzle is made of a conductive material, configured to spray the polytetrafluoroethylene suspended ultrafine powder and connected to the negative electrode of the DC power supply, and dense negative charges are produced on the nozzle; the conveyor belt of the spraying device is made of a conductive resin-based material and configured to place hydrate particles, the conveyor belt faces the nozzle, so that the suspended particles sprayed out from the nozzle come into contact with the hydrate particles to be sprayed; the conveyor belt is connected with the positive electrode of the DC power supply, so that the hydrate particles carry positive charges, and then an electric field required for spraying is formed between the nozzle and the conveyor belt.

Further, the device in step 5 comprises: a throttle valve, a capacitance manometer, a gas distribution nozzle, a high-pressure mercury lamp of ultraviolet lighting system, a water bath heating device, a vacuum pump and a closed container, wherein the closed container is connected to the throttle valve and the capacitance manometer at the inlet, to control the pressure of monomer vapor entering the closed container; the closed container is connected to the vacuum pump at the outlet, and the gas distribution nozzle is internally contained in the closed container to allow gas to be uniformly distributed in the closed container; the closed container is placed in the water bath heating device, to control the temperature in the closed container; and the high-pressure mercury lamp of ultraviolet lighting system irradiates outside the closed container, to promote the reaction.

Further, the polytetrafluoroethylene suspended ultrafine powder has a particle size of 2-12 μm, and is suitable for electrostatic spraying.

Further, the conveying speed of the conveyor belt is 0.5-2 m/s, the linear speed of spraying gas of the nozzle is 100-200 m/s, the powder content of the spraying gas is 1-2 kg/m$^3$, the voltage of the high-voltage electrostatic field is 60-90 kV, the distance between the nozzle and the conveyor belt is 200-300 mm.

Further, the monomer is a monomer solution, which is one of a dopamine methacrylamide solution with a solution concentration of 10%, a 2-hydroxyethyl methacrylate solution with a solution concentration of 30% and a glycidyl methacrylate solution with a solution concentration of 30%, wherein the evaporation temperature of the dopamine methacrylamide solution is 109-110° C., the evaporation temperature of the 2-hydroxyethyl methacrylate solution is 95° C., and the evaporation temperature of the glycidyl methacrylate solution is 67° C.

Compared with the prior art, the present invention has the following beneficial effects: (1) Compared with the organic phase change material, the refrigerant hydrate used by the present invention as a phase change material has higher thermal conductivity, so high the heat conductivity coefficient can be guaranteed; and is easy in nucleation, is good in reversibility and is reusable in work in the use process because the refrigerant hydrate is nucleated before production.

(2) The present invention utilizes graft polymerization of monomer steam and surface free radicals to make the polymer to be distributed uniformly on the outer surface of the hydrate energy-storage temperature-control material; because no liquid is present on the polytetrafluoroethylene surface, the monomer has $H_2C=C(CH_3)-CO$-functional group, adheres to the polytetrafluoroethylene surface through the universal adhesion thereof, and is subjected to graft polymerization with the free radicals on the polytetrafluoroethylene surface under the ultraviolet irradiation system, to obtain a cross-linked polymeron the particle surface, making the microcapsule surface shell more compact; due to the presence of graft polymerization, the force generated by the valence between the core and the outer surface shell is much larger than the Van der Waals force between typical core and shell, so that the hydrate energy-storage temperature-control material has high stability.

(3) In the preparation method provided by the present invention, any refrigerant hydrate may be used, and the properties of the refrigerant hydrate may not affect the application of the method.

DETAILED DESCRIPTION

Figure 1:
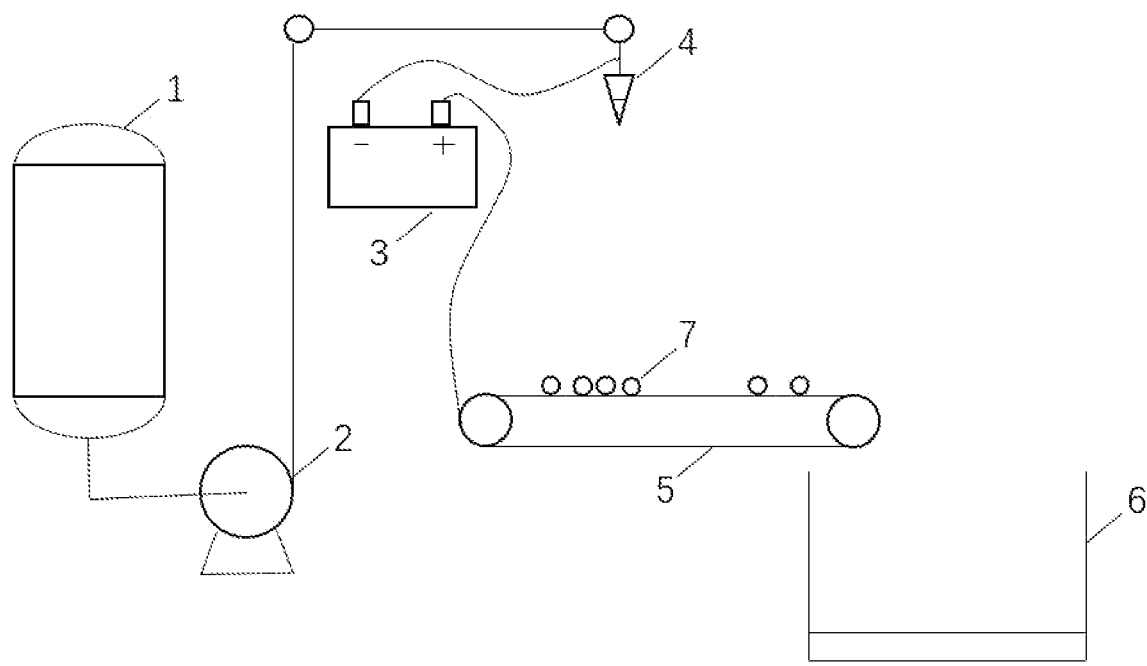
FIG. 1 is a system schematic diagram of an electrostatic spraying device of the present invention;
In the figure: 1. storage bin; 2. coating propulsion device; 3. DC power supply; 4. nozzle; 5. conveyor belt; 6. collection device; 7. hydrate particle.
Figure 2:
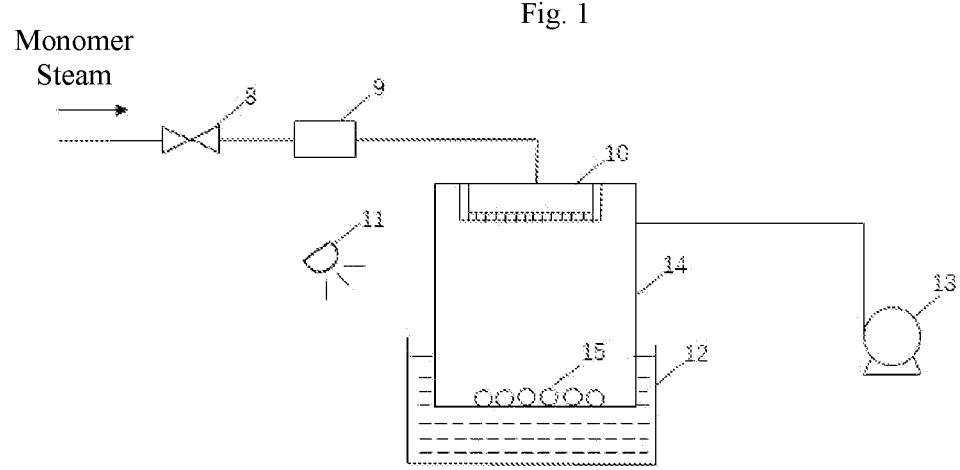
FIG. 2 is a schematic diagram of a device used in the process of graft polymerization of monomer and free radicals of the present invention;
In the figure: 8. throttle valve; 9. capacitance manometer; 10 gas distribution nozzle; 11. high-pressure mercury lamp of ultraviolet lighting system; 12. water bath heating device; 13. vacuum pump; 14. closed container; 15. hydrate particle wrapped by modified PTFE powder.

Specific embodiments of the present invention are further described below in combination with the drawings and the technical solution.

Taking a cyclopentane hydrate as an example, a preparation method for a hydrate energy-storage temperature-control material, comprising the following steps:

(1) Generating a hydrate: cleaning and flushing a reactor for three times by using deionized water, pouring the water into the reactor and sealing, evacuating a top space, vacuumizing the reactor for 30 min by using a vacuum pump to exhaust air from the reactor, and then turning off the vacuum pump. Measuring the temperature in the reactor by using a temperature sensor in the reactor, measuring the pressure in the reactor by using a pressure sensor, and gathering pressure and temperature signals by a data recording system and collecting same by a personal computer. Injecting cyclopentane refrigerant into the reactor first as liquid refrigerant, i.e. cyclopentane is used, to allow the mole ratio of the cyclopentane refrigerant to water to be 1:17, and then cooling the reactor to a required temperature, i.e. 2° C. by using a refrigeration cycle water bath system in which the reactor is placed. Pressurizing the reactor to a required pressure, i.e. 0.2 MPa after the temperature in the reactor is stabilized, and turning on a magnetic stirrer (having a stirring speed of 550 rpm) to initiate generation of the hydrate. Judging whether the hydrate is formed through the increase of temperature or decrease of pressure observed in the reactor. In this specific embodiment, judging whether the hydrate is initially formed through the increase of temperature in the reactor, if the temperature in the reactor suddenly increases, it is indicated that the hydrate formation reaction begins to release heat, and then if the temperature in the reactor gradually decreases until the temperature is stabilized at the original temperature, i.e. 2° C. within 1 h, it is indicated that a stable state is reached, and the hydrate is generated completely. After the hydrate is generated completely, opening a reduction valve, and taking out the hydrate from the reactor rapidly.

(2) Crushing the hydrate: taking out the formed hydrate from the reactor, crushing, grinding, and sieving by using a screen to obtain hydrate particles with a particle size of 180-250 μm, and centrifuging by using a low-speed centrifugal machine at a revolving speed of not less than 2000 r/min for solid-liquid separation for 10-20 min. Taking out solid hydrate particles, and weighing same by using an electronic analytical balance.

(3) Spraying polytetrafluoroethylene suspended ultrafine powder onto the hydrate particles 7 by an electrostatic spraying device. The storage bin 1 is configured to internally store a spraying material i.e. polytetrafluoroethylene suspended ultrafine powder. The coating propulsion device 2 is connected with a spraying device of the storage bin 1 and the nozzle 4 respectively, and the spraying material in the storage bin 1 is pressurized, so that the polytetrafluoroethylene suspended ultrafine powder is sprayed out from the nozzle. The coating propulsion device 2 comprises a liquid propellant and carrier gas. The nozzle 4 is made of a conductive material, configured to spray the polytetrafluoroethylene suspended ultrafine powder and connected to the negative electrode of the DC power supply 3, and dense negative charges are produced on the nozzle. The conveyor belt 5 of the spraying device is made of a conductive resin-based material and configured to place the hydrate particles 7. The conveyor belt 5 faces the nozzle, so that the suspended particles sprayed out from the nozzle 4 come into contact with the hydrate particles 7 to be sprayed. The conveyor belt 5 is connected with the positive electrode of the DC power supply 3, so that the hydrate particles carry positive charges, and then an electric field required for spraying is formed between the nozzle 4 and the conveyor bel 5. After entering the electric field, the polytetrafluoroethylene suspended particles carrying charges may automatically fly towards the hydrate particles under the influence of the electric field force until the hydrate particles 7 are completely wrapped by the polytetrafluoroethylene suspended ultrafine powder and fall into the collection device 6.

(4) Placing the hydrate particles onto which the polytetrafluoroethylene powder is sprayed into a PMT100A plasma instrument with a power of 200 W, processing by using an argon plasma at a gas flow of 120 ppm and a pressure of 45 Pa for 6 min, to allow free radicals to be formed on the polytetrafluoroethylene surface; and irradiating by using an ultraviolet lamp to measure the concentration of the free radicals on the polytetrafluoroethylene surface.

(5) Placing the hydrate particles 15 wrapped by modified PTFE powder into the vacuum closed container 14, heating a monomer solution with a solution concentration of 10%, i.e. dopamine methacrylamide solution until steam evaporates, keeping an airflow pressure at 46.7 Pa by using a throttle valve 8, introducing into the closed container 14 by a capacitance manometer 9 through a gas distribution nozzle Connecting the closed container 14 to the vacuum pump 13, cooling by using a water bath 12 of 30° C. and irradiating by using a high-pressure mercury lamp 11 of ultraviolet lighting system for 80 min (the power of the high-pressure mercury lamp 11 of ultraviolet lighting system is 1000 W, and the ultraviolet intensity is 6 mW/cm$^2$), until the graft polymerization reaction is completed, obtaining a stable shell formed from PDMA-PS on the polytetrafluoroethylene surface. Cleaning by using methanol and drying under nitrogen flow, obtaining the hydrate energy-storage temperature-control material.

(6) Measuring product: measuring the mass of the hydrate energy-storage temperature-control material by the electronic analytical balance; measuring the particle diameter of the hydrate energy-storage temperature-control material by using an LA960 particle size analyzer of which the operating temperature is 25° C.; measuring the composition and latent heat of the hydrate energy-storage temperature-control material by using a differential scanning calorimeter, wherein all measurements are performed in a nitrogen environment, each of the heating rate and cooling rate is 5° C./min. Sealing about 6 mg of the particles of the hydrate energy-storage temperature-control material in a stainless steel crucible with an O-ring. Converting the refrigerant into hydrate completely through thermal cycle: cooling a sample to a low temperature $T_{low}$ which is usually −30° C.; heating and scanning the sample at −30° C. to 40° C., completing heating and scanning for the first time, and keeping the sample at each temperature for 5 min to reduce thermal effects before formal measurements.

Experimental Data Processing Method:

Because the measurement results directly obtained by means of the preparation device and method for a hydrate energy-storage temperature-control material are mass, volume and phase change latent heat, there is a need to perform thermodynamic calculation on the measurement results. By calculating the hydrate mass percentage $M_{hydrate}$ %, the encapsulation rate R, the encapsulation efficiency E and the heat Q transferred from a single microcapsule to the outside world, the performance of the hydrate energy-storage temperature-control material used in the phase-change temperature-control field is studied.

The theoretical hydrate mass percentage of the sample is represented by $M_{hydrate}$ %:

$$M_{hydrate} \% = \frac{M_{hydrate}}{M} \times 100\% \qquad (1)$$

where $M_{hydrate}$ represents the hydrate particle mass of the crushed hydrate, and M represents the total mass of the hydrate capsule products.

The encapsulation rate of the sample hydrate is represented by R:

$$R = \frac{\Delta H_{m,hydrate}}{\Delta H_m} \times 100\% \quad (2)$$

The encapsulation efficiency of the sample hydrate is represented by E:

$$E = \frac{\Delta H_{m,hydrate} + \Delta H_{c,hydrate}}{\Delta H_m + \Delta H_c} \quad (3)$$

where $\Delta H_{m,hydrate}$ represents the phase change enthalpy in the melting process of decomposing the hydrate into liquid water and liquid refrigerant, $\Delta H_{c,hydrate}$ the phase change enthalpy in the solidification process of synthesizing the liquid water and the liquid refrigerant into hydrate, and $\Delta H_m$ and $\Delta H_c$ respectively represent the phase change enthalpies in the melting process and the solidification process of the hydrate energy-storage temperature-control product measured by using the differential scanning calorimeter.

The heat transferred to the outside world in the phase change process of a single hydrate energy-storage temperature-control particle is represented by Q:

$$Q = -kA\frac{dt}{dr} = -4\pi r^2 k \frac{dt}{dr} \quad (4)$$

integral:

$$\int_{t_1}^{t_2} dt = -\frac{Q}{4\pi k} \int_{r_1}^{r_2} \frac{dr}{r^2} \quad (5)$$

Where $t_1, t_2$ respectively represent the temperature (phase change temperature) of the hydrate in the particles and the external ambient temperature, k represents the heat conductivity coefficient of the material shell, and $r_1$ and $r_2$ respectively represent the inside radius and outside radius of the single material particle.

$r_1$ can be calculated by the following formula:

$$r_1 = \left(M_{hydrate} / \frac{4}{3}\pi\rho\right)^{1/3} \quad (6)$$

where $M_{hydrate}$ represents the hydrate particle mass of the crushed hydrate, and ρ represents the density of the hydrate.

$\emptyset_{hydrate}$ can be calculated by the following formula:

$$\emptyset_{hydrate} = M_{hydrate} / \frac{4}{3}\pi r_2^3 \rho \quad (7)$$

where $\emptyset_{hydrate}$ represents the percentage of the hydrate in the total volume of the material particles, and $r_2$ represents the mean radius of the material particles measured by a particle size measuring instrument.

The density ρ of the cyclopentane hydrate can be calculated by the following formula:

$$\rho = \frac{N_w MW_{H_2O} + y_1\alpha_1 MW_g + y_2\alpha_2 MW_g}{N_{Avo} V_{cell}} \quad (8)$$

where for ρ, according to the assumption from Sloan (1998), assuming that guest molecules completely occupy the large cage of the hydrate, $N_w$ represents the number of water molecules per unit cell, $N_w=136$; MW represents molecule mass, the molecule mass of $MW_{H_2O}$ is 18, and the guest molecule mass of $MW_g$ is 70; y represents the partial occupancy rate of each cavity, α represents the number of cavities of each water molecule, subscripts 1 and 2 respectively represent small cavities and large cavities, the cyclopentane hydrate only occupies the large cavities, thus $y_1=0$, $y_2=1$, and $\alpha_1=16$, $\alpha_2=8$. $V_{cell}$ represents the volume which is $(17.3\times10\text{-}10)^3 m^3$ of each unit cell, and $N_{Avo}$ represents Avogadro's constant. The density of 964.691 g/cm³ of the cyclopentane hydrate can be obtained through calculation.

The heat storage capacity of the hydrate energy-storage temperature-control material particles is represented by $Q_h$:

$$Q_h = \int_{t_i}^{t_1} M_{hydrate} c_p dt + M_{hydrate} fL + \int_{t_1}^{t_2} M_{hydrate} c_p dt \quad (9)$$

where $t_i$ represents initial temperature, $t_2$ represents final temperature, f represents melting fraction, L represents phase change latent heat, and $c_p$ represents specific heat capacity of hydrate. The phase change latent heat can be obtained according to experimental data, L=338.800 kJ/kg which is higher than 247 kJ/kg of phase change latent heat of formic acid and 186 kJ/kg of phase change latent heat of propylene glycol.

The constant pressure heat capacity $c_p$ can be calculated by the following formula:

$$c_p = a + bT + cT^2 + dT^3 \quad (10)$$

where a, b, c, d represent the heat capacity parameters of the hydrate, for the cyclopentane hydrate, a=−124.33, b=3.2592, c=2×10⁻⁶ and d=−4×10⁻⁹.

The hydrate energy-storage temperature-control material is used to release cooling amount and adjust the temperature in a room. When the initial temperature $t_i$ of the material is 2° C. and the final temperature $t_2$ (ambient temperature) thereof is 15° C. and the hydrate in the material melts completely, the cyclopentane hydrate can release 349.118 kJ/kg of heat which is higher than 279.45 kJ/kg of heat released by formic acid and 218.37 kJ/kg of heat released by propylene glycol under the same condition, thereby having good energy storage characteristics.

The phase change time of a single hydrate energy-storage temperature-control material particle is represented by τ:

$$\tau = \frac{M_{hydrate}}{m_H} \quad (11)$$

where $m_H$ represents the phase change rate of the hydrate energy-storage temperature-control material particle.

According to the hydrate thermal decomposition rate model studied by Kamath, the phase change rate $m_H$ of the hydrate energy-storage temperature-control material particle can be calculated by the following formula:

$$\frac{m_H}{\phi_{hydrate} A} = 6.464 \times 10^{-4} (t_2 - t_i)^{2.05}. \qquad (12)$$

The invention claimed is:

1. A preparation method for a hydrate energy-storage temperature-control material, comprising the following steps:
  step 1. generating a refrigerant hydrate;
  step 2. crushing the hydrate: taking out the formed hydrate from a reactor, crushing, grinding and sieving by using a screen to obtain hydrate particles with a particle size of 180-250 μm and weighing same, and centrifuging by using a centrifugal machine at a revolving speed of not less than 2000 r/min for solid-liquid separation for 10-20 min;
  step 3. spraying polytetrafluoroethylene suspended ultrafine powder onto the hydrate particles by using an electrostatic spraying device: placing the hydrate particles crushed in step 2 on a conveyor belt (5), and adding a high-voltage electrostatic field between a nozzle (4) and the hydrate particles (7), so the polytetrafluoroethylene suspended powder is adsorbed and coated onto the hydrate particles under the action of electrostatic force and gravity;
  step 4. placing the hydrate particles (15) onto which the polytetrafluoroethylene powder is sprayed into a plasma instrument, and processing by using argon plasma so as to allow free radicals to be formed on the polytetrafluoroethylene surface;
  step 5. placing a hydrate particles wrapped by modified PTFE powder into a vacuum closed container, heating a monomer solution until steam evaporates, keeping an airflow pressure at 40-50 Pa by using a throttle valve (8), introducing into the closed container (14), cooling the closed container (14) by using a water bath of 25-30° C. and irradiating by using a high-pressure mercury lamp (11) of ultraviolet lighting system for 80-90 min, to promote graft polymerization of a monomer and free radicals; obtaining the hydrate energy-storage temperature-control material.

2. The preparation method for a hydrate energy-storage temperature-control material according to claim 1, wherein generating the refrigerant hydrate in step 1 includes: ① cleaning and flushing the reactor by using deionized water, pouring the water into the reactor, and exhausting air from the reactor by using a vacuum pump; ② introducing refrigerant into the reactor, cooling the reactor to a temperature below the hydrate phase equilibrium temperature and above the freezing temperature by using a refrigeration cycle cooling system in which the reactor is placed according to the type of the refrigerant and the refrigerant hydrate phase diagram, pressurizing the reactor to the pressure point in a hydrate stabilization region corresponding to the temperature in the phase diagram after the temperature in the reactor is stabilized, and turning on a magnetic stirrer to initiate generation of the hydrate; ③ judging whether the hydrate is initially formed through the increase of temperature in the reactor, if the temperature in the reactor suddenly increases, it is indicated that the hydrate formation reaction begins to release heat, and then if the temperature in the reactor gradually decreases until the temperature is stabilized at the original temperature within 1 h, it is indicated that a stable state is reached, and the hydrate is generated completely; measuring the temperature in the reactor by using a temperature sensor in the reactor, measuring the pressure in the reactor by using a pressure sensor, and gathering pressure and temperature signals by a data recording system and collecting same by a personal computer.

3. The preparation method for a hydrate energy-storage temperature-control material according to claim 1, wherein the refrigerant hydrate is a mixed liquid of one or more of tetrahydrofuran, cyclopentane and methylcyclohexane.

4. The preparation method for a hydrate energy-storage temperature-control material according to claim 2, wherein a magnetic stirrer is present in the reactor, and the magnetic stirrer has a revolving speed of 500-600 rpm, to initiate generation of the refrigerant hydrate.

5. The preparation method for a hydrate energy-storage temperature-control material according to claim 1, wherein the polytetrafluoroethylene suspended ultrafine powder used in step 3 has a particle size of 2-12 μm.

6. The preparation method for a hydrate energy-storage temperature-control material according to claim 1, wherein the electrostatic spraying device in step 3 comprises: a storage bin (1), a coating propulsion device (2), a DC power supply (3), a nozzle (4), a conveyor belt (5) and a collection device (6), wherein the storage bin (1) is configured to internally store a spraying material, i.e. polytetrafluoroethylene suspended ultrafine powder; the coating propulsion device (2) is connected with a spraying device of the storage bin (1) and the nozzle (4) respectively; the nozzle (4) is made of a conductive material, configured to spray the polytetrafluoroethylene suspended ultrafine powder and connected with a negative electrode of the DC power supply (3), and dense negative charges are produced on the nozzle; the conveyor belt (5) of the spraying device is made of a conductive resin-based material and configured to place the hydrate particles (7), the conveyor belt (5) faces the nozzle, so that the suspended particles sprayed out from the nozzle (4) come into contact with the hydrate particles (7) to be sprayed; the conveyor belt (5) is connected with a positive electrode of the DC power supply (3), so that the hydrate particles carry positive charges, and then an electric field required for spraying is formed between the nozzle (4) and the conveyor belt (5).

7. The preparation method for a hydrate energy-storage temperature-control material according to claim 1, wherein a conveying speed of the conveyor belt (5) in step 3 is 0.5-2 m/s, the linear speed of spraying gas of the nozzle (4) is 100-200 m/s, the powder content of the spraying gas is 1-2 kg/m³, the voltage of the high-voltage electrostatic field is 60-90 kV, and the distance between the nozzle (4) and the conveyor belt is 200-300 mm.

8. The preparation method for a hydrate energy-storage temperature-control material according to claim 1, wherein the monomer in step (5) is a monomer solution, which is one of a dopamine methacrylamide solution with a solution concentration of 10%, a 2-hydroxyethyl methacrylate solution with a solution concentration of 30% and a glycidyl methacrylate solution with a solution concentration of 30%, wherein the evaporation temperature of the dopamine methacrylamide solution is 109-110° C., the evaporation temperature of the 2-hydroxyethyl methacrylate solution is 95° C., and the evaporation temperature of the glycidyl methacrylate solution is 67° C.

9. The preparation method for a hydrate energy-storage temperature-control material according to claim 1, wherein a device in step 5 comprises: a throttle valve (8), a capacitance manometer (9), a gas distribution nozzle (10), a high-pressure mercury lamp (11) of ultraviolet lighting system, a water bath heating device (12), a vacuum pump (13) and a closed container (14), wherein the closed container (14) is connected to the throttle valve (8) and the capacitance manometer (9) at the inlet, to control the pressure of monomer steam entering the closed container; the closed container (14) is connected to the vacuum pump (13) at the outlet, and the gas distribution nozzle (10) is internally contained in the closed container to allow gas to be uniformly distributed in the closed container (14); the closed container is placed in the water bath heating device (12), to control the temperature in the closed container; and the high-pressure mercury lamp (11) of ultraviolet lighting system irradiates outside the closed container, to promote the reaction.

\* \* \* \* \*